(12) United States Patent
Murakami et al.

(10) Patent No.: US 7,054,049 B2
(45) Date of Patent: May 30, 2006

(54) OPTICAL FILM, LAMINATED POLARIZING PLATE, LIQUID CRYSTAL DISPLAY USING THE SAME, AND SELF-LIGHT-EMITTING DISPLAY USING THE SAME

(75) Inventors: Nao Murakami, Ibaraki (JP); Takashi Yamaoka, Ibaraki (JP); Hiroyuki Yoshimi, Ibaraki (JP); Yuuichi Nishikouji, Ibaraki (JP); Masaki Hayashi, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 77 days.

(21) Appl. No.: 10/501,959

(22) PCT Filed: Jan. 22, 2003

(86) PCT No.: PCT/JP03/00510

§ 371 (c)(1),
(2), (4) Date: Jul. 21, 2004

(87) PCT Pub. No.: WO03/062875

PCT Pub. Date: Jul. 31, 2003

(65) Prior Publication Data

US 2005/0030456 A1 Feb. 10, 2005

Related U.S. Application Data

(60) Provisional application No. PCT/JP03/00510, filed on Jan. 22, 2003.

(30) Foreign Application Priority Data

Jan. 23, 2002 (JP) .............................. 2002-014529
May 24, 2002 (JP) .............................. 2002-151337

(51) Int. Cl.
*G02F 1/03* (2006.01)
*G02F 1/1335* (2006.01)
*G02B 5/30* (2006.01)

(52) U.S. Cl. ...................... 359/256; 359/500; 359/483; 359/494; 359/497; 349/118; 349/122

(58) Field of Classification Search ................ 359/256, 359/483, 494, 497, 499, 500; 349/117, 118, 349/119, 120, 121, 122, 158
See application file for complete search history.

(56) References Cited

U.S. PATENT DOCUMENTS 5,658,505 A 8/1997 Shimizu et al.
6,795,246 B1 * 9/2004 Yano et al. ................. 359/500

FOREIGN PATENT DOCUMENTS

| EP | 1 160 591 | 12/2001 |
|---|---|---|
| JP | 3-24502 | 2/1991 |
| JP | 3-33719 | 2/1991 |
| JP | 4-19482 | 1/1992 |
| JP | H08-62422 | 3/1996 |
| JP | 8-511812 | 12/1996 |
| JP | 10-508048 | 8/1998 |
| JP | 2000-190385 | 7/2000 |
| JP | 2000-511296 | 8/2000 |
| JP | 2001-290023 | 10/2001 |
| JP | 2001-318223 | 11/2001 |
| JP | 2001-343529 | 12/2001 |
| WO | WO 94/24191 | 10/1994 |
| WO | WO 96/11967 | 4/1996 |
| WO | WO 97/44704 | 11/1997 |

* cited by examiner

Primary Examiner—Hung Xuan Dang
Assistant Examiner—Tuyen Tra
(74) Attorney, Agent, or Firm—Westerman, Hattori, Daniels & Adrian, LLP

(57) ABSTRACT

The present invention provides a transparent optical film that has excellent optical characteristics for realizing the uniform retardation distribution and restraining rainbow-colored irregularities. The optical film, which is obtained by laminating a birefringent layer (a) on a transparent film (b), satisfies all the following formulae (I), (II) and (III).

$$\Delta n(a) > \Delta n(b) \times 10 \qquad (I)$$

$$1 < (nx-nz)/(nx-ny) \qquad (II)$$

$$0.0005 \leq \Delta n(a) \leq 0.5 \qquad (III)$$

In the above formulae (I), (II) and (III), $\Delta n(a)$ and $\Delta n(b)$ denote respectively birefringent indexes of the birefringent layer (a) and the transparent film (b). The signs of nx, ny and nz indicate refractive indexes in an X-axis direction, a Y-axis direction and a Z-axis direction in the birefringent layer (a), respectively. The X-axis corresponds to an axial direction exhibiting a maximum refractive index within a plane of the birefringent layer (a), the Y-axis corresponds to an axial direction perpendicular to the X-axis within the plane, and the Z-axis corresponds to a thickness direction perpendicular to the X-axis and the Y-axis.

16 Claims, 2 Drawing Sheets

OPTICAL FILM, LAMINATED POLARIZING PLATE, LIQUID CRYSTAL DISPLAY USING THE SAME, AND SELF-LIGHT-EMITTING DISPLAY USING THE SAME

This application is a 371 of PCT/JP03/00510 filed Jan. 22, 2003.

TECHNICAL FIELD

The present invention relates to an optical film, a laminated polarizing plate comprising the optical film laminated thereon, and a liquid crystal display and a self-light-emitting display using the same.

BACKGROUND ART

Conventionally, retardation plates have been used for the purpose of optical compensation in various liquid crystal displays. For such retardation plates, for example, optical biaxial retardation plates are used. The biaxial retardation plates can be manufactured by various kinds of polymer film stretching techniques such as roller tensile stretching, roller press stretching, and tenter transverse uniaxial stretching (for example, see JP 3(1991)-33719 A), and also manufactured by the technique of biaxial stretching to provide an anisotropy (for example, refer to JP 3(1991)-24502 A), or the like. Other examples include a retardation plate including both a uniaxially stretched polymer film having a positive optical anisotropy and a biaxially stretched polymer film having a negative optical anisotropy with a small in-plane retardation value (see JP 4(1992)-19482A). Alternatively, a retardation plate provided with a negative uniaxiality can be manufactured not by any of the above-mentioned stretching methods but by using the property of polyimide so as to process a soluble polyimide into a film on a substrate (JP 8(1996)-511812 A).

Stretched films formed by the above-described film-stretching techniques are provided, for example, with an optical characteristic nx>ny>nz. Here, nx, ny, nz indicate refractive indexes in an X-axis direction, a Y-axis direction and a Z-axis direction, respectively. The X-axis corresponds to an axial direction exhibiting a maximum refractive index within a plane of the film, the Y-axis corresponds to an axial direction perpendicular to the X-axis within the plane, and the Z-axis corresponds to a thickness direction perpendicular to the X-axis and the Y-axis. When arranged between a liquid crystal cell and a polarizer of a liquid crystal display, a birefringent film having the above-stated optical characteristics can widen a viewing angle of the liquid crystal display, and thus the birefringent film is useful as a viewing angle compensating film for the liquid crystal cell.

DISCLOSURE OF THE INVENTION

However, when a film with the above-mentioned optical characteristic is applied to a liquid crystal display, it has a problem of a rainbow-colored irregularity, although it has an advantage of a sharp contrast in a wide viewing angle.

Accordingly, an object of the present invention is to provide an optical film with a negative birefringence, which can prevent the rainbow-colored irregularity and provide an excellent display property, for example, when it is applied to various display apparatuses such as liquid crystal displays.

For achieving the object, an optical film of the present invention refers to an optical film comprising a birefringent layer (a) and a transparent film (b), in which the birefringent layer (a) is laminated on the transparent film (b) and all the following formulae (I), (II) and (III) are satisfied.

$$\Delta n(a) > \Delta n(b) \times 10 \quad (I)$$

$$1 < (nx-nz)/(nx-ny) \quad (II)$$

$$0.0005 \leq \Delta n(a) \leq 0.5 \quad (III)$$

Here, $\Delta n(a)$ and $\Delta n(b)$ in the above formulae (I), (II) and (III) are birefringent indexes of the birefringent layer (a) and the transparent film (b) respectively, and each of $\Delta n(a)$ and $\Delta n(b)$ is represented by the following equations. In the above formula (II) and the equations below, nx, ny and nz indicate refractive indexes in an X-axis direction, a Y-axis direction and a Z-axis direction in the birefringent layer (a), respectively. Similarly, nx', ny' and nz' indicate refractive indexes in an X-axis direction, a Y-axis direction and a Z-axis direction in the transparent film (b), respectively. The X-axis corresponds to an axial direction exhibiting a maximum refractive index within a plane of the birefringent layer (a) and the transparent film (b), the Y-axis corresponds to an axial direction perpendicular to the X-axis within the plane, and the Z-axis corresponds to a thickness direction perpendicular to the X-axis and the Y-axis.

$$\Delta n(a) = [(nx+ny)/2] - nz$$

$$\Delta n(b) = [(nx'+ny')/2] - nz'$$

As a result of earnest studies, inventors of the present invention found that the above-mentioned conventional problems can be solved when an optical film including a birefringent layer laminated on a transparent film satisfies all the conditions shown by the formulae (I), (II) and (III), leading to the present invention. More specifically, when, for example, optical films satisfying all the formulae (I), (II) and (III) are used in various display apparatuses such as liquid crystal displays, they provides a sharp contrast in the wide viewing angle and furthermore, they can prevent a rainbow-colored irregularity caused by depolarization, and thus a higher display quality is provided. As described below, this optical film can be manufactured by coating a polymer material such as polyimide directly onto the transparent film. Therefore, for example, there is no need to transcribe the birefringent layer on any other substrate or the like after formation of the birefringent layer on the transparent film, but the birefringent layer itself can be used as a laminate. Thus, the optical film of the present invention is excellent in uniformity of quality, workability or the like. Accordingly, since the optical film of the present invention is uniform and transparent and it has an excellent optical characteristic for a negative birefringent effect of nx>ny>nz, the optical film is suitably used for a laminated polarizing plate, a liquid crystal panel and various image display apparatuses such as a liquid crystal display and a self-light-emitting display.

BEST MODE FOR CARRYING OUT THE INVENTION

As stated above, an optical film of the present invention includes an a birefringent layer (a) and a transparent film (b), in which the birefringent layer (a) is laminated on the transparent film (b), and all of the formulae (I), (II) and (III) are satisfied.

In the present invention, since optical compensation is primarily carried out in the birefringent layer (a), it is necessary to satisfy the formula (I) so that the birefringent effect of the transparent film (b) may not prevent the optical compensation. By satisfying the formula (I), rainbow-colored irregularities caused by the depolarization is prevented, thus further excellent display properties can be obtained. For further improving viewing angle compensation and display properties, it is preferable, for example, that the relation between the $\Delta n(a)$ and $\Delta n(b)$ satisfies $\Delta n(a) > \Delta n(b) \times 15$, or more preferably, $\Delta n(a) > \Delta n(b) \times 20$.

In the present invention, it is required that the birefringent layer (a) satisfies the formula (II). When an optical film of the present invention satisfies $1 < (nx-nz)/(nx-ny)$, a birefringent index in a thickness direction becomes larger than a birefringent index within a plane of the film, so as to improve, for example, an optical compensation of a liquid crystal cell. It is more preferable to satisfy $1 < (nx-nz)/(nx-ny) \leq 100$. If the value of $(nx-nz)/(nx-ny)$ is 100 or smaller, for example, when the optical film of the present invention is applied to a liquid crystal display, a sufficient contrast ratio can be obtained, thus an excellent viewing angle property is realized. Furthermore, in order to obtain an excellent optical compensation, the value of $(nx-nz)/(nx-ny)$ is more preferably in the range of $1 < (nx-nz)/(nx-ny) \leq 80$, and further preferably in the range of $1 < (nx-nz)/(nx-ny) \leq 50$. For application to a liquid crystal display of vertical aligned (VA) mode, particularly preferable range is $1 < (nx-nz)/(nx-ny) \leq 30$.

Figure 1:
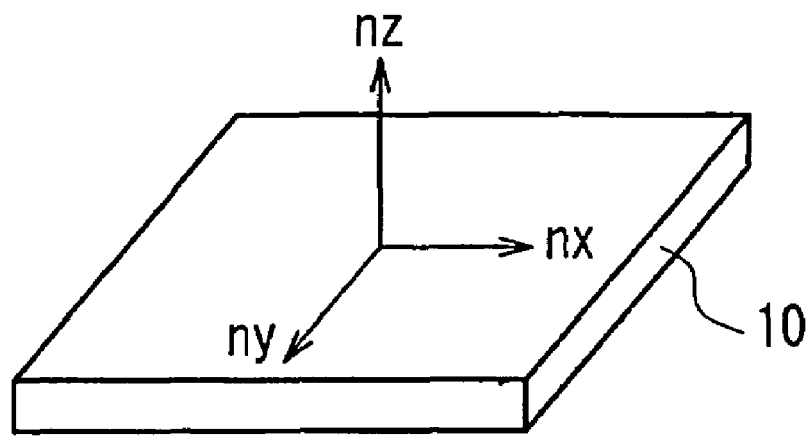
FIG. 1 is a perspective view showing optical axial directions according to the present invention.

In the schematic figure of FIG. 1, optical axis directions of refractive indexes (nx, ny, nz) in a birefringent layer (a) 10 are shown by arrows. As mentioned above, nx, ny and nz indicate refractive indexes in an X-axis direction, a Y-axis direction and a Z-axis direction, respectively. The X-axis corresponds to an axial direction exhibiting a maximum refractive index within a plane of the film, the Y-axis corresponds to an axial direction perpendicular to the X-axis within the plane, and the Z-axis corresponds to a thickness direction perpendicular to the X-axis and the Y-axis.

In the present invention, it is further necessary that the birefringent layer (a) satisfies the above-described formula (III) because of the following reason. When the $\Delta n(a)$ is lower than 0.0005, an optical film increases in thickness. When the $\Delta n(a)$ is larger than 0.5, controlling of a phase difference will be difficult. More preferably, the refractive index is in the range of $0.005 \leq \Delta n(a) \leq 0.2$, and particularly preferably, in the range of $0.02 \leq \Delta n(a) \leq 0.15$.

In the present invention, the thickness of the birefringent layer (a) is not particularly limited, but in order to obtain a thin liquid crystal display and also an optical film having an excellent viewing angle compensating function and a uniform phase difference, the thickness of the birefringent layer (a) preferably ranges from 0.1 to 50 μm, more preferably from 0.5 to 30 μm, or further preferably, from 1 to 20 μm. The thickness of the transparent film (b) can be determined according to the use or the like, however, in terms of the strength and decrease in the thickness of the layer, a preferable range for the thickness of the transparent film (b) is from 5 to 500 μm, or more preferably, from 10 to 200 μm, or further preferably, from 15 to 150 μm.

The birefringent layer (a) can be laminated on one or both surface(s) of the transparent film (b), and the laminate can include one or plural layer(s). The transparent film (b) can be a single layer or a laminate of plural layers. If the transparent film is a laminate, it can be composed of one or various kind(s) of polymer layers, depending on its uses such as the improvement in strength, heat resistance and adhesion of birefringent layers.

A material of the birefringent layer (a) is not specifically limited, as long as it satisfies all the above-stated conditions, but in order to satisfy the formula (I), the kind of the material is preferably selected, for example, according to the material of the transparent film mentioned below. In the selection, for example, it is preferable that the birefringent index of the birefringent layer formed by using the material is relatively high, while the following transparent film (b) is formed of a material that is selected to provide a relatively low birefringent index to the birefringent layer.

The material of the birefringent layer is preferably a non-liquid crystalline material, more preferably a non-liquid crystalline polymer. Unlike a liquid crystalline material, for example, such a non-liquid crystalline material forms a film that shows an optical uniaxiality of nx>nz, and ny>nz due to its character regardless of the orientation of a substrate. Therefore, a substrate to be used is not limited to an oriented substrate, and the processes such as coating an oriented film and laminating an oriented film on its surface, can be omitted even if a non-oriented substrate is used.

The non-liquid crystalline polymer preferably is a polymer such as polyamide, polyimide, polyester, polyetherketone, polyamideimide and polyesterimide because of its excellent heat resistance, chemical resistance, transparency and hardness. It may be possible to use one of these polymers alone or a mixture of two or more polymers having different functional groups, for example, a mixture of polyaryletherketone and polyamide. Among these polymers, polyimide is particularly preferable because a high transparency, a high orientation, and a high stretch property can be obtained.

The molecular weight of the above-mentioned polymer is not particularly limited, but the weight-average molecular weight (Mw) thereof preferably ranges from 1,000 to 1,000,000 and more preferably ranges from 2,000 to 500,000.

As the polyimide, it is preferable to use a polyimide that has a high in-plane orientation and is soluble in an organic solvent. For example, it is possible to use a condensation polymer of 9,9-bis(aminoaryl)fluorene and an aromatic tetracarboxylic dianhydride disclosed in JP 2000-511296 A, more specifically, a polymer containing at least one repeating unit represented by the formula (1) below.

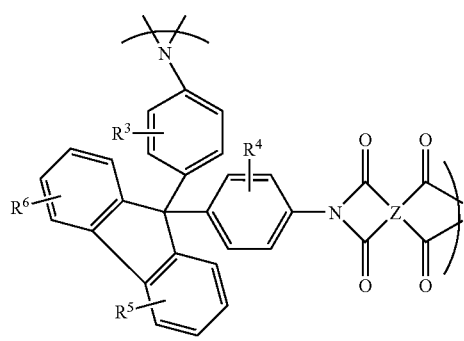

(1)

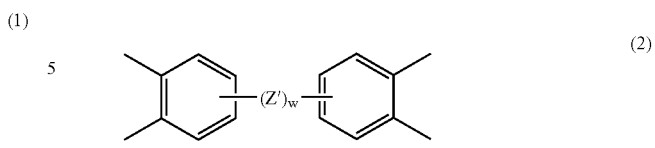

(2)

In the above formula (1), $R^3$ to $R^6$ are at least one substituent selected independently from the group consisting of hydrogen, halogen, a phenyl group, a phenyl group substituted with 1 to 4 halogen atoms or a $C_{1-10}$ alkyl group, and a $C_{1-10}$ alkyl group. Preferably, $R^3$ to $R^6$ are at least one substituent selected independently from the group consisting of halogen, a phenyl group, a phenyl group substituted with 1 to 4 halogen atoms or a $C_{1-10}$ alkyl group, and a $C_{1-10}$ alkyl group.

In the above formula (1), Z is, for example, a $C_{6-20}$ quadrivalent aromatic group, and preferably is a pyromellitic group, a polycyclic aromatic group, a derivative of a polycyclic aromatic group or a group represented by the formula (2) below.

In the formula (2) above, Z' is, for example, a covalent bond, a $C(R^7)_2$ group, a CO group, an O atom, an S atom, an $SO_2$ group, an $Si(C_2H_5)_2$ group or an $NR^8$ group. When there are plural Z's, they may be the same or different. Also, w is an integer from 1 to 10. $R^7$s independently are hydrogen or $C(R^9)_3$. $R^8$ is hydrogen, an alkyl group having from 1 to about 20 carbon atoms or a $C_{6-20}$ aryl group, and when there are plural $R^8$s, they may be the same or different. $R^9$s independently are hydrogen, fluorine or chlorine.

The above-mentioned polycyclic aromatic group may be, for example, a quadrivalent group derived from naphthalene, fluorene, benzofluorene or anthracene. Further, a substituted derivative of the above-mentioned polycyclic aromatic group may be the above-mentioned polycyclic aromatic group substituted with at least one group selected from the group consisting of, for example, a $C_{1-10}$ alkyl group, a fluorinated derivative thereof and halogen such as F and Cl.

Other than the above, homopolymer whose repeating unit is represented by the general formula (3) or (4) below or polyimide whose repeating unit is represented by the general formula (5) below disclosed in JP 8(1996)-511812 A may be used, for example. The polyimide represented by the formula (5) below is a preferable mode of the homopolymer represented by the formula (3).

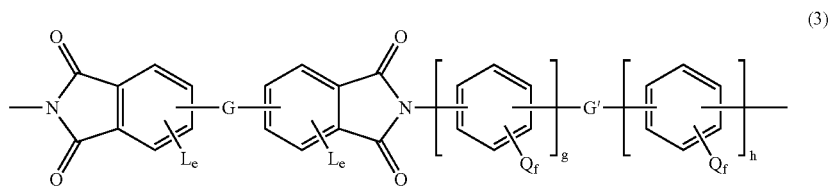

(3)

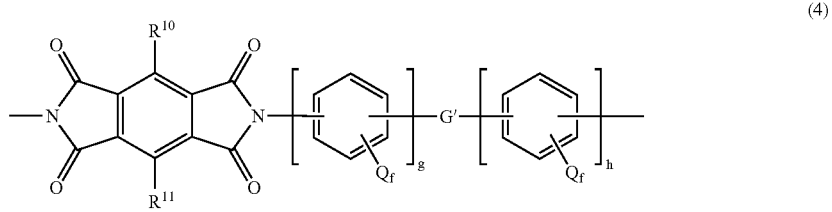

(4)

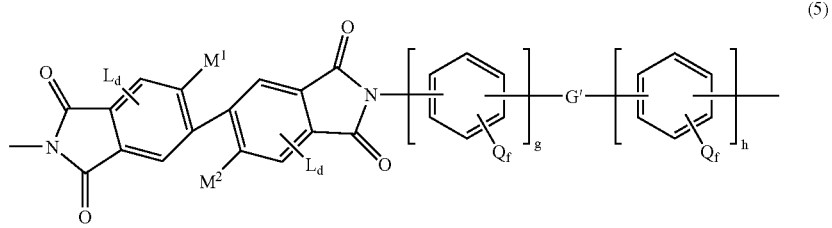

(5)

In the above general formulae (3) to (5), G and G' each are a group selected independently from the group consisting of, for example, a covalent bond, a $CH_2$ group, a $C(CH_3)_2$ group, a $C(CF_3)_2$ group, a $C(CX_3)_2$ group (wherein X is halogen), a CO group, an O atom, an S atom, an $SO_2$ group, an $Si(CH_2CH_3)_2$ group and an $N(CH_3)$ group, and G and G' may be the same or different.

In the above formulae (3) and (5), L is a substituent, and d and e indicate the number of substitutions therein. L is, for example, halogen, a $C_{1-3}$ alkyl group, a halogenated $C_{1-3}$ alkyl group, a phenyl group or a substituted phenyl group, and when there are plural Ls, they may be the same or different. The above-mentioned substituted phenyl group may be, for example, a substituted phenyl group having at least one substituent selected from the group consisting of halogen, a $C_{1-3}$ alkyl group and a halogenated $C_{1-3}$ alkyl group. Also, the above-mentioned halogen may be, for example, fluorine, chlorine, bromine or iodine. d is an integer from 0 to 2, and e is an integer from 0 to 3.

In the above formulae (3) to (5), Q is a substituent, and f indicates the number of substitutions therein. Q may be, for example, an atom or a group selected from the group consisting of hydrogen, halogen, an alkyl group, a substituted alkyl group, a nitro group, a cyano group, a thioalkyl group, an alkoxy group, an aryl group, a substituted aryl group, an alkyl ester group and a substituted alkyl ester group and, when there are plural Qs, they may be the same or different. The above-mentioned halogen may be, for example, fluorine, chlorine, bromine or iodine. The above-mentioned substituted alkyl group may be, for example, a halogenated alkyl group. Also, the above-mentioned substituted aryl group may be, for example, a halogenated aryl group. f is an integer from 0 to 4, and g and h respectively are an integer from 0 to 3 and an integer from 1 to 3. Furthermore, it is preferable that g and h are larger than 1.

In the above formula (4), $R^{10}$ and $R^{11}$ are groups selected independently from the group consisting of hydrogen, halogen, a phenyl group, a substituted phenyl group, an alkyl group and a substituted alkyl group. It is particularly preferable that $R^{10}$ and $R^{11}$ independently are a halogenated alkyl group.

In the above formula (5), $M^1$ and $M^2$ may be the same or different and, for example, halogen, a $C_{1-3}$ alkyl group, a halogenated $C_{1-3}$ alkyl group, a phenyl group or a substituted phenyl group. The above-mentioned halogen may be, for example, fluorine, chlorine, bromine or iodine. The above-mentioned substituted phenyl group may be, for example, a substituted phenyl group having at least one substituent selected from the group consisting of halogen, a $C_{1-3}$ alkyl group and a halogenated $C_{1-3}$ alkyl group.

A specific example of polyimide represented by the formula (3) includes polyimide represented by the formula (6) below.

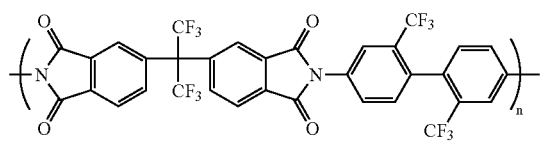

(6)

Moreover, the above-mentioned polyimide may be, for example, copolymer obtained by copolymerizing acid dianhydride and diamine other than the above-noted skeleton (the repeating unit) suitably.

The above-mentioned acid dianhydride may be, for example, aromatic tetracarboxylic dianhydride. The aromatic tetracarboxylic dianhydride may be, for example, pyromellitic dianhydride, benzophenone tetracarboxylic dianhydride, naphthalene tetracarboxylic dianhydride, heterocyclic aromatic tetracarboxylic dianhydride or 2,2'-substituted biphenyl tetracarboxylic dianhydride.

The pyromellitic dianhydride may be, for example, pyromellitic dianhydride, 3,6-diphenyl pyromellitic dianhydride, 3,6-bis(trifluoromethyl)pyromellitic dianhydride, 3,6-dibromopyromellitic dianhydride or 3,6-dichloropyromellitic dianhydride. The benzophenone tetracarboxylic dianhydride may be, for example, 3,3',4,4'-benzophenone tetracarboxylic dianhydride, 2,3,3',4'-benzophenone tetracarboxylic dianhydride or 2,2',3,3'-benzophenone tetracarboxylic dianhydride. The naphthalene tetracarboxylic dianhydride may be, for example, 2,3,6,7-naphthalenetetracarboxylic dianhydride, 1,2,5,6-naphthalenetetracarboxylic dianhydride or 2,6-dichloro-naphthalene-1,4,5,8-tetracarboxylic dianhydride. The heterocyclic aromatic tetracarboxylic dianhydride may be, for example, thiophene-2,3,4,5-tetracarboxylic dianhydride, pyrazine-2,3,5,6-tetracarboxylic dianhydride or pyridine-2,3,5,6-tetracarboxylic dianhydride. The 2,2'-substituted biphenyl tetracarboxylic dianhydride may be, for example, 2,2'-dibromo-4,4',5,5'-biphenyl tetracarboxylic dianhydride, 2,2'-dichloro-4,4',5,5'-biphenyl tetracarboxylic dianhydride or 2,2'-bis(trifluoromethyl)-4,4',5,5'-biphenyl tetracarboxylic dianhydride.

Other examples of the aromatic tetracarboxylic dianhydride may include 3,3',4,4'-biphenyl tetracarboxylic dianhydride, bis(2,3-dicarboxyphenyl)methane dianhydride, bis(2,5,6-trifluoro-3,4-dicarboxyphenyl)methane dianhydride, 2,2-bis(3,4-dicarboxyphenyl)-1,1,1,3,3,3-hexafluoropropane dianhydride, 4,4'-(3,4-dicarboxyphenyl)-2,2-diphenylpropane dianhydride, bis(3,4-dicarboxyphenyl)ether dianhydride, 4,4'-oxydiphthalic dianhydride, bis(3,4-dicarboxyphenyl)sulfonic dianhydride, (3,3',4,4'-diphenylsulfone tetracarboxylic dianhydride), 4,4'-[4,4'-isopropylidene-di(p-phenyleneoxy)]bis(phthalic dianhydride), N,N-(3,4-dicarboxyphenyl)-N-methylamine dianhydride and bis(3,4-dicarboxyphenyl)diethylsilane dianhydride.

Among the above, the aromatic tetracarboxylic dianhydride preferably is 2,2'-substituted biphenyl tetracarboxylic dianhydride, more preferably is 2,2'-bis(trihalomethyl)-4,4',5,5'-biphenyl tetracarboxylic dianhydride, and further preferably is 2,2'-bis(trifluoromethyl)-4,4',5,5'-biphenyl tetracarboxylic dianhydride.

The above-mentioned diamine may be, for example, aromatic diamine. Specific examples thereof include benzenediamine, diaminobenzophenone, naphthalenediamine, heterocyclic aromatic diamine and other aromatic diamines.

The benzenediamine may be, for example, diamine selected from the group consisting of benzenediamines such as o-, m- and p-phenylenediamine, 2,4-diaminotoluene, 1,4-diamino-2-methoxybenzene, 1,4-diamino-2-phenylbenzene and 1,3-diamino-4-chlorobenzene. Examples of the diaminobenzophenone may include 2,2'-diaminobenzophenone and 3,3'-diaminobenzophenone. The naphthalenediamine may be, for example, 1,8-diaminonaphthalene or 1,5-diaminonaphthalene. Examples of the heterocyclic aromatic diamine may include 2,6-diaminopyridine, 2,4-diaminopyridine and 2,4-diamino-S-triazine.

Further, other than the above, the aromatic diamine may be 4,4'-diaminobiphenyl, 4,4'-diaminodiphenyl methane, 4,4'-(9-fluorenylidene)-dianiline, 2,2'-bis(trifluoromethyl)-

4,4'-diaminobiphenyl, 3,3'-dichloro-4,4'-diaminodiphenyl methane, 2,2'-dichloro-4,4'-diaminobiphenyl, 2,2',5,5'-tetrachlorobenzidine, 2,2-bis(4-aminophenoxyphenyl)propane, 2,2-bis(4-aminophenyl)propane, 2,2-bis(4-aminophenyl)-1,1,1,3,3,3-hexafluoropropane, 4,4'-diamino diphenyl ether, 3,4'-diamino diphenyl ether, 1,3-bis(3-aminophenoxy)benzene, 1,3-bis(4-aminophenoxy)benzene, 1,4-bis(4-aminophenoxy)benzene, 4,4'-bis(4-aminophenoxy)biphenyl, 4,4'-bis(3-aminophenoxy)biphenyl, 2,2-bis[4-(4-aminophenoxy)phenyl]propane, 2,2-bis[4-(4-aminophenoxy)phenyl]-1,1,1,3,3,3,-hexafluoropropane, 4,4'-diamino diphenyl thioether or 4,4'-diaminodiphenylsulfone.

The polyetherketone as a material for forming the birefringent layer (a) may be, for example, polyaryletherketone represented by the general formula (7) below, which is disclosed in JP 2001-49110 A.

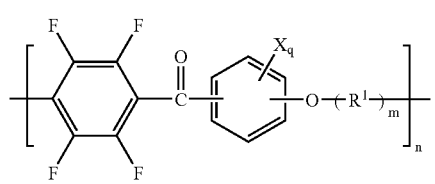
(7)

In the above formula (7), X is a substituent, and q is the number of substitutions therein. X is, for example, a halogen atom, a lower alkyl group, a halogenated alkyl group, a lower alkoxy group or a halogenated alkoxy group, and when there are plural Xs, they may be the same or different.

The halogen atom may be, for example, a fluorine atom, a bromine atom, a chlorine atom or an iodine atom, and among these, a fluorine atom is preferable. The lower alkyl group preferably is a $C_{1-6}$ lower straight alkyl group or a $C_{1-6}$ lower branched alkyl group and more preferably is a $C_{1-4}$ straight or branched chain alkyl group, for example. More specifically, it preferably is a methyl group, an ethyl group, a propyl group, an isopropyl group, a butyl group, an isobutyl group, a sec-butyl group or a tert-butyl group, and particularly preferably is a methyl group or an ethyl group. The halogenated alkyl group may be, for example, a halide of the above-mentioned lower alkyl group such as a trifluoromethyl group. The lower alkoxy group preferably is a $C_{1-6}$ straight or branched chain alkoxy group and more preferably is a $C_{1-4}$ straight or branched chain alkoxy group, for example. More specifically, it further preferably is a methoxy group, an ethoxy group, a propoxy group, an isopropoxy group, a butoxy group, an isobutoxy group, a sec-butoxy group or a tert-butoxy group, and particularly preferably is a methoxy group or an ethoxy group. The halogenated alkoxy group may be, for example, a halide of the above-mentioned lower alkoxy group such as a trifluoromethoxy group.

In the above formula (7), q is an integer from 0 to 4. In the formula (7), it is preferable that q=0 and a carbonyl group and an oxygen atom of an ether that are bonded to both ends of a benzene ring are present at para positions.

Also, in the above formula (7), $R^1$ is a group represented by the formula (8) below, and m is an integer of 0 or 1.

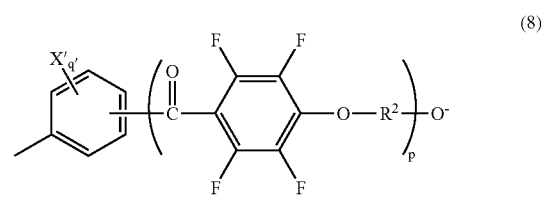
(8)

In the above formula (8), X' is a substituent and is the same as X in the formula (7), for example. In the formula (8), when there are plural X's, they may be the same or different. q' indicates the number of substitutions in the X' and is an integer from 0 to 4, preferably, q'=0. In addition, p is an integer of 0 or 1.

In the formula (8), $R^2$ is a divalent aromatic group. This divalent aromatic group is, for example, an o-, m- or p-phenylene group or a divalent group derived from naphthalene, biphenyl, anthracene, o-, m- or p-terphenyl, phenanthrene, dibenzofuran, biphenyl ether or biphenyl sulfone. In these divalent aromatic groups, hydrogen that is bonded directly to the aromatic may be substituted with a halogen atom, a lower alkyl group or a lower alkoxy group. Among them, the $R^2$ preferably is an aromatic group selected from the group consisting of the formulae (9) to (15) below.

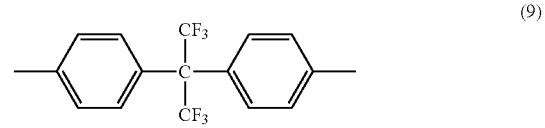
(9)

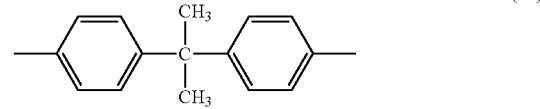
(10)

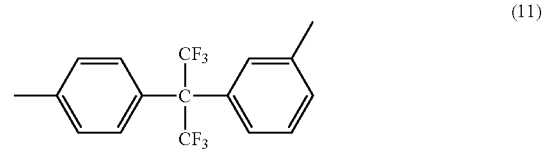
(11)

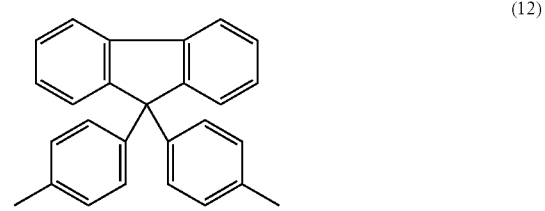
(12)

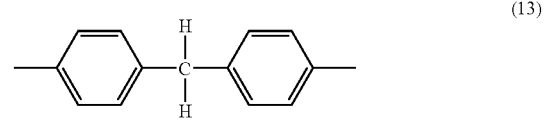
(13)

(14)

(15)

In the above formula (7), the $R^1$ preferably is a group represented by the formula (16) below, wherein $R^2$ and p are equivalent to those in the above-noted formula (8).

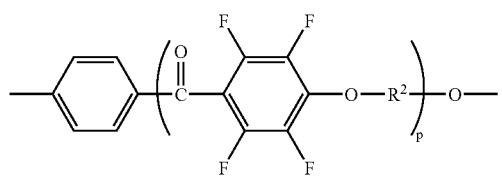
(16)

Furthermore, in the formula (7), n indicates a degree of polymerization ranging, for example, from 2 to 5000 and preferably from 5 to 500. The polymerization may be composed of repeating units with the same structure or those with different structures. In the latter case, the polymerization form of the repeating units may be a block polymerization or a random polymerization.

Moreover, it is preferable that an end on a p-tetrafluorobenzoylene group side of the polyaryletherketone represented by the formula (7) is fluorine and an end on an oxyalkylene group side thereof is a hydrogen atom. Such a polyaryletherketone can be represented by the general formula (17) below. In the formula below, n indicates a degree of polymerization as in the formula (7).

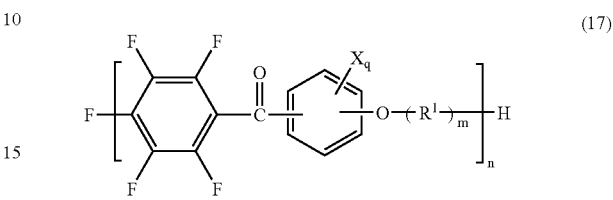
(17)

Specific examples of the polyaryletherketone represented by the formula (7) may include those represented by the formulae (18) to (21) below, wherein n indicates a degree of polymerization as in the formula (7).

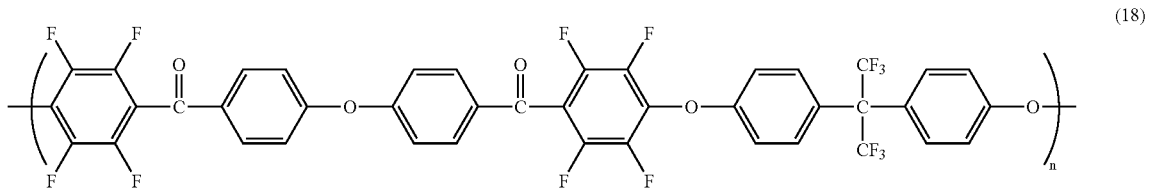
(18)

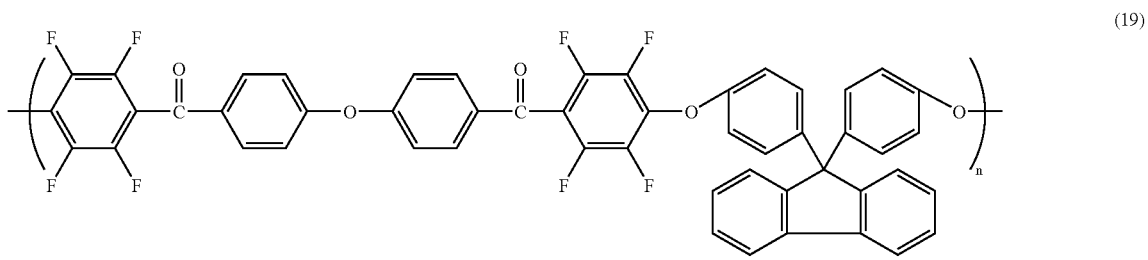
(19)

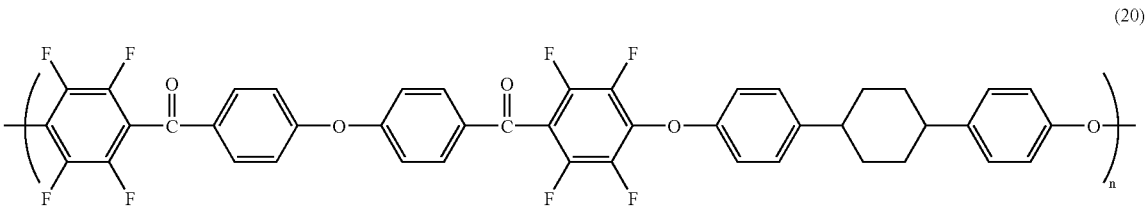
(20)

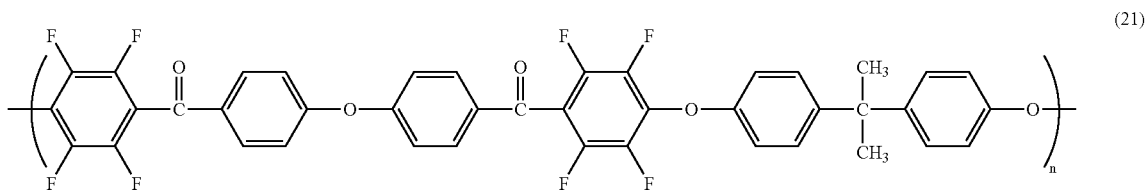
(21)

Other than the above, the polyamide or polyester as a material for forming the birefringent layer (a) may be, for example, polyamide or polyester described by JP 10(1998)-508048 A, and their repeating units can be represented by the general formula (22) below.

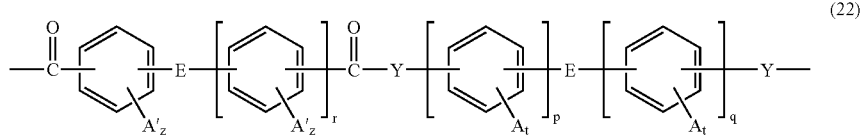

(22)

In the above formula (22), Y is O or NH. E is, for example, at least one group selected from the group consisting of a covalent bond, a $C_2$ alkylene group, a halogenated $C_2$ alkylene group, a $CH_2$ group, a $C(CX_3)_2$ group (wherein X is halogen or hydrogen), a CO group, an O atom, an S atom, an $SO_2$ group, an $Si(R)_2$ group and an $N(R)$ group, and Es may be the same or different. In the above-mentioned E, R is at least one of a $C_{1-3}$ alkyl group and a halogenated $C_{1-3}$ alkyl group and present at a meta position or a para position with respect to a carbonyl functional group or a Y group.

Further, in the above formula (22), A and A' are substituents, and t and z respectively indicate the numbers of substitutions therein. Additionally, p is an integer from 0 to 3, q is an integer from 1 to 3, and r is an integer from 0 to 3.

The above-mentioned A is selected from the group consisting of, for example, hydrogen, halogen, a $C_{1-3}$ alkyl group, a halogenated $C_{1-3}$ alkyl group, an alkoxy group represented by OR (wherein R is the group defined above), an aryl group, a substituted aryl group by halogenation, a $C_{1-9}$ alkoxycarbonyl group, a $C_{1-9}$ alkylcarbonyloxy group, a $C_{1-12}$ aryloxycarbonyl group, a $C_{1-12}$ arylcarbonyloxy group and a substituted derivative thereof, a $C_{1-12}$ arylcarbamoyl group, and a $C_{1-12}$ arylcarbonylamino group and a substituted derivative thereof. When there are plural As, they may be the same or different. The above-mentioned A' is selected from the group consisting of, for example, halogen, a $C_{1-3}$ alkyl group, a halogenated $C_{1-3}$ alkyl group, a phenyl group and a substituted phenyl group and when there are plural A's, they may be the same or different. A substituent on a phenyl ring of the substituted phenyl group can be, for example, halogen, a $C_{1-3}$ alkyl group, a halogenated $C_{1-3}$ alkyl group or a combination thereof. The t is an integer from 0 to 4, and the z is an integer from 0 to 3.

Among the repeating units of the polyamide or polyester represented by the formula (22) above, the repeating unit represented by the general formula (23) below is preferable.

In the formula (23), A, A' and Y are those defined by the formula (22), and v is an integer from 0 to 3, preferably is an integer from 0 to 2. Although each of x and y is 0 or 1, not both of them are 0.

On the other hand, a material of the transparent film (b) is not specifically limited as long as it satisfies the formula (I) in the present invention, but it preferably is a polymer with excellent transparency, and thermoplastic resin that is suitable for achieving the below-mentioned stretching treatment and shrinking treatment. More specifically, the material of the transparent film (b) may be for example, acetate resin such as triacetylcellulose (TAC), polyester resin, polyethersulfone resin, polysulfone resin, polycarbonate resin, polyamide resin, polyimide resin, polyolefin resin, acrylic resin, polynorbornene resin, cellulose resin, polyarylate resin, polystyrene resin, polyvinylalcohol resin, polyvinylchloride resin, polyvinylidene chloride resin, polyacrylic resin, and a mixture thereof. A liquid crystal polymer is exemplified as well. Moreover, for example, a mixture of a thermoplasitc resin whose side chain has a substituted or unsubstituted imide group and a thermoplastic resin whose side chain has a substituted or unsubstituted phenyl group and a nitrile group, which is described in JP 2001-343529 A (WO01/37007), can be used. A specific example of the mixed thermoplastic resin is a resin composition containing alternating copolymer containing isobutene and N-methylmaleimide and a copolymer of acrylonitrile/styrene. Among these materials exemplified above, for example, a material which can provide relatively lower birefringent index when used to form a transparent film is preferred, more specifically, the above-described mixture of a thermoplastic resin whose side chain has a substituted or unsubstituted imide group and a thermoplastic resin whose side chain has a substituted or unsubstituted phenyl group and a nitrile group is preferable.

Next, a method of manufacturing an optical film of the present invention is mentioned below. Method of manufacturing an optical film of the present invention is not specifically limited as long as it satisfies the formula (I), (II) and (III), but for example, first and second methods described below can be applied.

The first method of manufacturing an optical film of the present invention includes forming of a coating film by

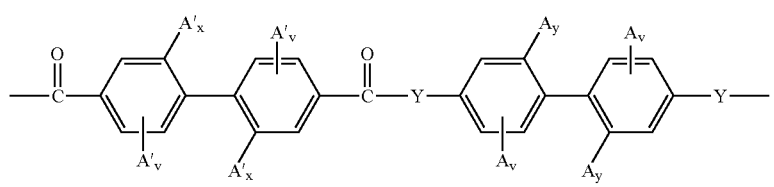

(23)

applying the material of the birefringent layer directly on the transparent substrate that shows uniaxial shrinking property within the plane, and shrinking the coating film by means of shrinkage of the transparent substrate. The coating film is shrunk in accordance with the shrinkage of the transparent substrate. In this method, the shrunken transparent substrate becomes the transparent film (b), and the shrunken coating film becomes the birefringent layer (a), thereby an optical film of the present invention having the birefringent layer (a) fixed directly on the transparent film (b) is obtained. As described above, the birefringent layer (a) of the present invention is laminated directly on the transparent film (b) and all the formulae (I), (II) and (III) are satisfied. The birefringent layer on the transparent film can be used directly as a viewing angle compensating film or the like without, for example, being transcribed onto another substrate as in the conventional technique. The substrate can be provided with a shrinking property by a preheating process or the like.

In this method, the non-liquid crystal polymer such as polyimide inherently shows an optical characteristic of nx=ny>nz, regardless of the presence or absence of the orientation of the transparent substrate. Therefore, the coating film formed by the polymer shows optical uniaxiality, more specifically, shows phase difference only in a thickness direction. Since the coating film on the transparent substrate is also shrunk in a thickness direction due to the shrinking property of the transparent substrate, the coating film will have an in-plane refractive difference, showing the optical biaxiality (nx>ny>nz). Moreover, for example, by selecting materials of a transparent substrate and a birefringent layer in the manner mentioned above, the formula (I) can be satisfied.

As described above, since the non-liquid crystal polymer possesses an optical uniaxiality, there is no need of using an orientation of a substrate. Therefore, both an oriented substrate and a non-oriented substrate can be used as the transparent substrate. The substrate can have a phase difference caused by birefringence, though the phase difference is not an essential property. An example of a transparent substrate that has a phase difference caused by the birefringent effect includes a stretched film. The stretched film can have a refractive index controlled in the thickness direction. The refractive index can be controlled by, for example, adhering a polymer film to a heat shrinkable film, and subsequently heat stretching.

The transparent substrate is preferably stretched in one direction within the layer so as to provide a shrinking property in the direction. By previously stretching in this manner, the shrinking force is generated in a direction against the stretching direction. The difference of the in-plane shrinkage of the transparent substrate is used to provide a difference of the in-plane refractive index to a non-liquid crystal material of the coating film. Specific conditions are described below.

The thickness of the unstretched transparent substrate is not particularly limited, but it preferably ranges from 10 to 200 μm, more preferably, from 20 to 150 μm, and particularly preferably, from 30 to 100 μm. The draw ratio of stretching is not specifically limited as long as a birefringent layer formed on the above-mentioned stretched transparent substrate shows the optical biaxiality (nx>ny>nz).

A method of coating a material of the birefringent layer onto the transparent substrate is not specifically limited, but the examples include heat-melting and coating the non-liquid crystal polymer, and coating a polymer solution prepared by dissolving the non-liquid crystal polymer in a solvent. Among the methods mentioned above, coating the polymer solution is preferred from its excellent workability.

Polymer density of the polymer solution is not particularly limited, but for example, it is preferably 5 to 50 parts by weight, or more preferably, 10 to 40 parts by weight of the polymer material is used with respect to 100 parts by weight of the solvent so as to obtain a suitable viscosity for the coating process.

Solvent of the polymer solution is not particularly limited as long as it can dissolve the material of the birefringent layer including the non-liquid crystal polymer, and can be determined according to the kind of the material. Examples thereof include halogenated hydrocarbons such as chloroform, dichloromethane, carbon tetrachloride, dichloroethane, tetrachloroethane, trichloroethylene, tetrachloroethylene, chlorobenzene and orthodichlorobenzene; phenols such as phenol and parachlorophenol; aromatic hydrocarbons such as benzene, toluene, xylene, methoxybenzene and 1,2-dimethoxybenzene; ketone-based solvents such as acetone, methyl ethyl ketone, methyl isobutyl ketone, cyclohexanone, cyclopentanone, 2-pyrrolidone and N-methyl-2-pyrrolidone; ester-based solvents such as ethyl acetate and butyl acetate; alcohol-based solvents such as tert-butyl alcohol, glycerin, ethylene glycol, triethylene glycol, ethylene glycol monomethyl ether, diethylene glycol dimethyl ether, propylene glycol, dipropylene glycol and 2-methyl-2,4-pentanediol; amide-based solvents such as dimethylformamide and dimethylacetamide; nitrile-based solvents such as acetonitrile and butyronitrile; ether-based solvents such as diethyl ether, dibutyl ether and tetrahydrofuran; or carbon disulfide, ethyl cellosolve or butyl cellosolve. These solvents may be used alone or in combination of two or more.

In the polymer solution, various known additives such as a stabilizer, a plasticizer, metal and the like further may be blended as necessary.

Moreover, the polymer solution may contain other resins as long as the orientation of the material does not drop considerably. Such resins can be, for example, resins for general purpose use, engineering plastics, thermoplastic resins and thermosetting resins.

The resins for general purpose use can be, for example, polyethylene (PE), polypropylene (PP), polystyrene (PS), polymethyl methacrylate (PMMA), an ABS resin, an AS resin or the like. The engineering plastics can be, for example, polyacetate (POM), polycarbonate (PC), polyamide (PA: nylon), polyethylene terephthalate (PET), polybutylene terephthalate (PBT) or the like. The thermoplastic resins can be, for example, polyphenylene sulfide (PPS), polyethersulfone (PES), polyketone (PK), polyimide (PI), polycyclohexanedimethanol terephthalate (PCT), polyarylate (PAR), liquid crystal polymers (LCP) or the like. The thermosetting resins can be, for example, epoxy resins, phenolic novolac resins or the like.

When the above-described other resins are blended in the polymer solution as mentioned above, the blend amount ranges, for example, from 0 wt % to 50 wt %, preferably from 0 wt % to 30 wt %, with respect to the polymer material.

Examples of the method of coating the polymer solution include spin coating, roller coating, flow coating, printing, dip coating, film flow-expanding, bar coating, gravure printing, or the like. In the coating, a method of superimposing a polymer layer can be adopted, as necessary.

Furthermore, the transparent substrate is shrunk by heating a coating film on the transparent substrate. In accordance with the shrinkage of the transparent substrate, this coating film is shrunk, thereby forming the birefringent layer (a).

Though conditions of the heat processing are not limited specifically and can be determined according to the kinds or the like of the materials of the transparent substrate, for example, the temperature preferably ranges from 25 to 300° C., more preferably, from 50 to 200° C., and particularly preferably, from 60 to 180° C.

After the heating, the solvent of the polymer solution remaining in the birefringent layer (a) may change optical characteristics of the optical film over time in proportion to the residual amount. Therefore, the amount of the remaining solvent is preferably 5% or the less, and more preferably 2% or the less, and further preferably 0.2% or less.

The second method of manufacturing the optical film of the present invention includes forming a coating film by directly coating the material of the birefringent layer on the transparent substrate, thereafter stretching the transparent substrate and the coating film together. In this method, the stretched transparent substrate becomes the transparent film (b), and similarly, the stretched coating film becomes the birefringent layer (a). Therefore, the optical film of the present invention has the birefringent layer (a) fixed directly on the transparent film (b). The optical film obtained by the second method has an effect similar to the optical film obtained by the first method mentioned above. In the second manufacturing method, the process of coating the material of the birefringent layer (a) may be the same as that in the first manufacturing method.

In this method, similar to the first method of manufacturing, the non-liquid crystal polymer such as polyimide shows an optical characteristic of nx=ny>nz, regardless of the presence or absence of the orientation in the transparent substrate. Therefore, the coating film formed by the polymer shows optical uniaxiality. In addition, by stretching the laminate of the transparent substrate and the coating film in one of the directions in the plane, the coating film will have a refractive difference in the plane, thereby showing the optical biaxiality (nx>ny>nz).

Methods of stretching the laminate of the transparent substrate and the coating film are not particularly limited, but examples include stretching the film uniaxially in the longitudinal direction (free-end longitudinal stretching), stretching the film uniaxially in the transverse direction while the film is fixed in the longitudinal direction (fixed-end transverse stretching), and stretching the film both in the longitudinal and transverse directions (sequential or concurrent biaxial stretching).

Though the stretching of the laminate may be carried out, for example, by stretching both the transparent substrate and the coating film together, it is preferable, for example, that only the transparent substrate is stretched, for the following reason. When stretching the transparent substrate solely, the coating film on the transparent substrate is stretched indirectly by a tension generated in the transparent substrate as a result of this stretching. In general, a more uniform stretch can be obtained when stretching a single layer than stretching a laminate. Therefore, by uniformly stretching the transparent substrate, the coating film on the transparent substrate can be stretched also uniformly.

Conditions of stretching are not particularly limited but can be determined according to the kinds of the materials of the transparent substrate, the birefringent layer or the like. Specifically, the draw ratio of stretching is greater than 1 and not greater than 5, more preferably, greater than 1 and not greater than 4, and particularly preferably, greater than 1 and not greater than 3.

When manufacturing an optical film by the second manufacturing method, the formula (I) can be satisfied by, for example, selecting materials for the transparent substrate and the birefringent layer in the above-described manner,.

A method for manufacturing an optical film of the present invention other than the first and second methods mentioned above includes forming the material of the birefringent layer (a) as a thin film on the transparent substrate being under a stress in one direction within the plane.

Alternatively, for example, the materials are formed into thin films on the transparent film (b) by blowing air or the like in one direction, or the materials are coated on the transparent film (b) provided with the anisotropy.

It is preferable that the optical film of the present invention further includes at least one of an adhesive layer and a pressure-sensitive adhesive layer in order to facilitate adhesion of the optical film of the present invention with the other members such as the other optical layers and a liquid crystal cell, and also to prevent the optical film of the present invention from peeling off. Accordingly, the adhesive layer and the pressure-sensitive adhesive layer are laminated preferably on the outermost surface of the optical film. More specifically, the layers may be laminated on one or both outermost surface(s) of the optical film.

Though there is no specific limitation on the material of the adhesive layer, examples of the materials used for the adhesive layer include a rubber-based pressure sensitive adhesive and a pressure-sensitive adhesive based on a polymer such as an acrylic substances, vinyl alcohol, silicone, polyester, polyurethane and polyether. Fine particles can also be blended into those materials in order to form an adhesive layer having a light diffusion property. Among them, materials having excellent moisture-absorption and heat resistance are preferred. A liquid crystal display manufactured by using the materials will be excellent in quality and durability, since disadvantages such as foaming and peeling caused by moisture absorption, degradation in the optical characteristics and warping of the liquid crystal cell that are caused by a difference in the thermal expansion, can be prevented.

The optical film of the present invention can be used solely as mentioned above, or it can be combined with other optical members as required so as to form a laminate for various optical uses. More specifically, the optical film can be used for an optical compensating member, in particular, for a viewing angle compensating member. The optical member to be combined with the optical film is not particularly limited, but an example thereof is a polarizer, explained below in detail.

A laminated polarizing plate of the present invention characterized in that it includes an optical film and a polarizer, and the optical film is provided according to the present invention.

Figure 2:
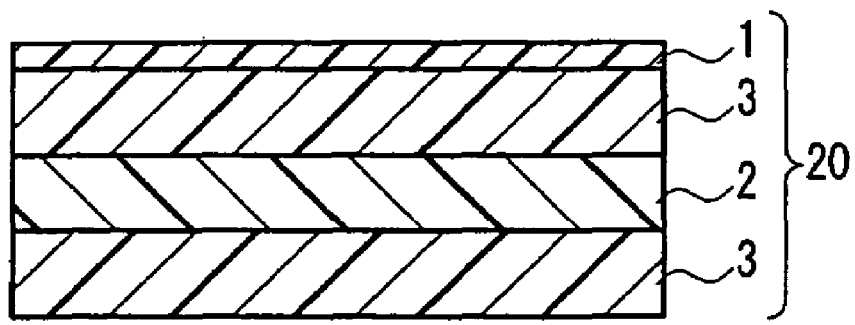
FIG. 2 is a cross-sectional view of an example of a laminated polarizing plate of the present invention.
Figure 3:
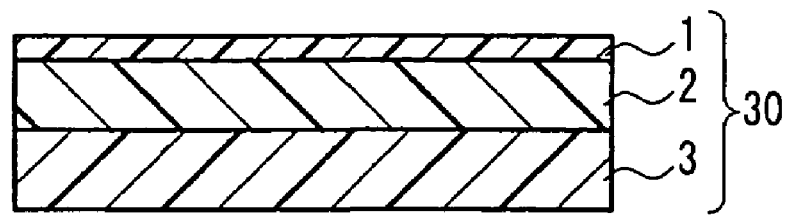
FIG. 3 is a cross-sectional view of another example of a laminated polarizing plate of the present invention.

The configuration of the polarizing plate is not limited particularly as long as it includes an optical film of the present invention, but the examples are illustrated in FIGS. 2 and 3. FIGS. 2 and 3 are cross-sectional views respectively showing the examples of the laminated polarizing plate of the present invention, with the same parts assigned with the same reference numerals. Here, the polarizing plate of the present invention is not limited to the configuration mentioned below, and may further include other optical members or the like.

The laminated polarizing plate 20 shown in FIG. 2, includes the optical film 1 of the present invention, the polarizer 2, and a two transparent protective layers 3, wherein the transparent protective layers 3 are laminated on both sides of the polarizer 2, and the optical film 1 is further laminated respectively on one of the transparent protective layers 3. Since the optical film 1 is a laminate of the birefringent layer (a) and the transparent film (b) as mentioned above, either surface of the optical film 1 can face the transparent protective film 3.

The transparent protective films 3 can be laminated on one or both surface(s) of the polarizer 2. When the transparent protective films 3 are laminated on both surfaces of the polarizer 2, they may be the same or different.

The laminated polarizing plate 30 in FIG. 3 includes the optical film 1 of the present invention, the polarizer 2 and the transparent protective films 3, and the optical film 1 and the transparent protective films 3 are laminated on the respective surfaces of the polarizer 2.

As mentioned above, since the optical film 1 is a laminate of the birefringent layer (a) and the transparent film (b), either surface of the optical film 1 can face the polarizer 2. Preferably, the optical film is arranged so that the transparent film (b) of the optical film 1 faces the polarizer 2. For example, the transparent film (b) of the optical film 1 can be used also as a transparent protective layer in a laminated polarizing plate. More specifically, instead of laminating transparent protective layers on both surfaces of the polarizer, a transparent protective layer is laminated on one surface of the polarizer, and the optical film is laminated on the other surface of the polarizer so that the transparent film will be faced the polarizer. Thereby, the transparent film can also function as a transparent protective layer on the other surface of the polarizer. As a result, the thickness of the polarizing plate can be decreased further.

The polarizer is not particularly limited, but can be a film, for example, prepared by being dyed by adsorbing a dichroic material such as iodine or a dichroic dye, followed by cross-linking, stretching and drying. Among them, films that can penetrate linearly polarized light when natural light is entered, more specifically, films having excellent light transmittance and polarization degree are preferable. Examples of the polymer film in which the dichroic material is to be adsorbed include hydrophilic polymer films such as polyvinyl alcohol (PVA)-based films, partially-formalized PVA-based films, partially-saponified films based on ethylene-vinyl acetate copolymer and cellulose-based films. Other than the above, a polyene oriented film such as dehydrated PVA and dehydrochlorinated polyvinyl chloride can be used, for example. Among them, the PVA-based film is preferable. In addition, the thickness of the polarizing film generally ranges from 1 to 80 μm, though it is not limited to this.

The protective layer is not particularly limited but can be a conventionally known transparent film. For example, transparent protective films having excellent transparency, mechanical strength, thermal stability, moisture shielding property and isotropism are preferable. Specific examples of materials for such a transparent protective layer can include cellulose-based resins such as cellulose triacetate (TAC), and transparent resins based on polyester, polycarbonate, polyamide, polyimide, polyethersulfone, polysulfone, polystyrene, polynorbornene, polyolefin, acrylic substances, acetate and the like. Thermosetting resins or ultraviolet-curing resins based on the acrylic substances, urethane, acrylic urethane, epoxy, silicones and the like can be used as well. Among them, a TAC film having a surface saponified with alkali or the like is preferable in light of the polarization property and durability.

Another example of the polymer film is described in JP 2001-343529 A (WO 01/37007). The polymer material used can be a resin composition containing a thermoplastic resin whose side chain has a substituted or unsubtituted imido group and a thermoplastic resin whose side chain has a substituted or unsubtituted phenyl group and nitrile group, for example, a resin composition containing an alternating copolymer of isobutene and N-methylmaleimide and an acrylonitrile-styrene copolymer. Alternatively, the polymer film may be formed by extruding the resin composition.

It is preferable that the protective layer is colorless. More specifically, a retardation value (Rth) of the film in its thickness direction as represented by the equation below preferably ranges from −90 nm to +75 nm, more preferably ranges from −80 nm to +60 nm, and particularly preferably ranges from −70 nm to +45 nm. When the retardation value is within the range of −90 nm to +75 nm, coloring (optical coloring) of the polarizing plate, which is caused by the protective film, can be solved sufficiently. In the equation below, nx, ny and nz are equivalent to those described above, and d indicates the thickness of this film.

$$Rth=\{[(nx+ny)/2]-nz\}\times d$$

The transparent protective layer may further have an optically compensating function. As such a transparent protective layer having the optically compensating function, it is possible to use, for example, a known layer used for preventing coloring caused by changes in a visible angle based on retardation in a liquid crystal cell or for widening a preferable viewing angle. Specific examples include various films obtained by stretching the above-described transparent resins uniaxially or biaxially, an oriented film of a liquid crystal polymer or the like, and a laminate obtained by providing an oriented layer of a liquid crystal polymer on a transparent base. Among the above, the oriented film of a liquid crystal polymer is preferable because a wide viewing angle with excellent visibility can be achieved. Particularly preferable is an optically compensating retardation plate obtained by supporting an optically compensating layer with the above-mentioned triacetylcellulose film or the like, where the optically compensating layer is made of an incline-oriented layer of a discotic or nematic liquid crystal polymer. This optically compensating retardation plate can be a commercially available product, for example, "WV film" manufactured by Fuji Photo Film Co., Ltd. Alternatively, the optically compensating retardation plate can be prepared by laminating two or more layers of the optical retardation film and a film support of triacetylcellulose film or the like so as to control optical characteristics such as retardation.

The thickness of the transparent protective layer is not particularly limited but can be determined suitably according to retardation or a protection strength. In general, the thickness is not greater than 500 μm, preferably ranges from 5 to 300 μm, and more preferably ranges from 5 to 150 μm.

The transparent protective layer can be formed suitably by a known method such as a method of coating a polarizing film with the above-mentioned various transparent resins or a method of laminating the transparent resin film, the optically compensating retardation plate or the like on the polarizing film, or can be a commercially available product.

The transparent protective layer may be further subjected to, for example, a hard coating treatment, an antireflection treatment, treatments for anti-sticking, diffusion and antiglaring and the like. The hard coating treatment aims to prevent scratches on the surfaces of the polarizing plate, and is a treatment of, for example, providing a hardened coating film that is formed of a curable resin and has excellent hardness and smoothness onto a surface of the transparent protective film. The curable resin can be, for example, ultraviolet-curing resins of silicone base, urethane base, acrylic, and epoxy base. The treatment can be carried out by a known method. The anti-sticking treatment aims to prevent adjacent layers from sticking to each other. The antireflection treatment aims to prevent reflection of external light on the surface of the polarizing plate, and can be carried out by forming a known antireflection film or the like.

The anti-glare treatment aims to prevent hindering visibility of light transmitted through the polarizing plate due to the reflection of external light on the polarizing plate surface. The anti-glare treatment can be carried out, for example, by providing microscopic asperities on a surface of a transparent protective film by a known method. Such microscopic asperities can be provided, for example, by roughening the surface by sand-blasting or embossing, or by blending transparent fine particles in the above-described transparent resin when forming the transparent protective layer.

The above-described transparent fine particles may be silica, alumina, titania, zirconia, stannic oxide, indium oxide, cadmium oxide, antimony oxide or the like. Other than the above, inorganic fine particles having an electrical conductivity or organic fine particles comprising, for example, crosslinked or uncrosslinked polymer particles can be used as well. The average particle diameter of the transparent fine particles ranges, for example, from 0.5 to 20 μm, though there is no specific limitation. In general, a blend ratio of the transparent fine particles preferably ranges from 2 to 70 parts by weight, and more preferably ranges from 5 to 50 parts by weight with respect to 100 parts by weight of the above-described transparent resin, though there is no specific limitation.

An anti-glare layer in which the transparent fine particles are blended can be used as the transparent protective layer itself or provided as a coating layer applied onto the transparent protective layer surface. Furthermore, the anti-glare layer also can function as a diffusion layer to diffuse light transmitted through the polarizing plate in order to widen the viewing angle (i.e., visually-compensating function).

The antireflection layer, the anti-sticking layer, the diffusion layer and the anti-glare layer mentioned above can be laminated on the polarizing plate, as an sheet of optical layers comprising these layers, separately from the transparent protective layer.

Method for laminating each members (an optical film, a polarizer, a transparent protective layer, etc) is not particularly limited and can be a conventional method. Generally, the above-mentioned adhesive and sticking agent can be used, and the kind thereof can be determined suitably depending on materials of the birefringent layer and the polarizing plate. The adhesive can be, for example, a polymer adhesive based on acrylic substances, vinyl alcohol, silicone, polyester, polyurethane or polyether, or a rubber-based adhesive. It also is possible to use an adhesive or rubber adhesive containing a water-soluble cross-linking agent of vinyl alcohol-based polymers such as glutaraldehyde, melamine and oxalic acid. The sticking agent and the adhesive mentioned above do not peel off easily even when being exposed to moisture or heat, for example, and have excellent light transmittance and polarization degree. More specifically, these sticking agent and adhesive preferably are PVA-based adhesives when the polarizing plate is a PVA-based film, in light of stability of adhering treatment. These sticking agent and adhesive may be applied directly to surfaces of the polarizing plate and the transparent protective layer, or a layer of a tape or a sheet formed of the sticking agent or adhesive may be arranged on the surfaces thereof. Further, when these sticking agent and adhesive are prepared as an aqueous solution, for example, other additives or a catalyst such as an acid catalyst may be blended as necessary. In the case of applying the adhesive, other additives or a catalyst such as an acid catalyst further may be blended in the aqueous solution of the adhesive. The thickness of the adhesive layer is not particularly limited but may be, for example, 1 to 500 nm, preferably 10 to 300 nm, and more preferably 20 to 100 nm. It is possible to adopt a known method of using an adhesive such as an acrylic polymer or a vinyl alcohol-based polymer without any particular limitations. Moreover, in order to form a polarizing plate that does not peel off easily by moisture or heat and has excellent light transmittance and polarization degree, the adhesive preferably further contains a water-soluble crosslinking agent of PVA-based polymers such as glutaraldehyde, melamine and oxalic acid. These adhesives can be used, for example, by applying its aqueous solution to the surface of each member mentioned above, followed by drying. In the above aqueous solution, other additives or a catalyst such as an acid catalyst may be blended as necessary. Among these, the adhesive preferably is a PVA-based adhesive because an excellent adhesiveness to a PVA film can be achieved.

The optical film of the present invention can be used in combination with, for example, various retardation plates, diffusion-control films, and brightness-enhancement films. The retardation film can be prepared by, for example, stretching a polymer uniaxially or biaxially, subjecting a polymer to Z-axis orientation, or coating a liquid crystal polymer on a base. The diffusion-control films can use diffusion, scattering, and refraction for controlling viewing angles, or for controlling glaring and scattered light that will affect definition. The brightness-enhancement film may include a λ/4 wavelength plate (a λ/4 plate) and a selective reflector of a cholesteric liquid crystal, and a scattering film using an anisotropic scatter depending on the polarization direction. The optical film can be, for example, combined with a wire grid polarizer.

In use, the laminated polarizing plate of the present invention can further contain other optical layers in addition to the optical films of the present invention. Examples of the optical layers include conventionally known optical layers used for forming liquid crystal displays or the like, such as below-mentioned polarizing plates, reflectors, semitransparent reflectors, and brightness-enhancement films. These optical layers can be used alone, or at least two kinds of layers can be used together. A laminated polarizing plate further including the optical layer is used preferably as an integrated polarizing plate having an optical compensation function, and for example, it is suitably applied to various image displays, for example, by being arranged on a surface of a liquid crystal cell.

The integrated polarizing plate will be described below in detail.

First, an example of a reflective polarizing plate or a semitransparent reflective polarizing plate is described. The reflective polarizing plate is prepared by laminating a reflector additionally on the laminated polarizing plates of the present invention, and a semitransparent reflective polarizing plate is prepared by laminating a semitransparent reflector additionally on the laminated polarizing plates of the present invention.

In general, the reflective polarizing plate is arranged on a backside of a liquid crystal cell in order to make a liquid crystal display to reflect incident light from a visible side (display side) of a reflective type liquid crystal display. The reflective polarizing plate has some merits, for example, assembling of light sources such as backlight can be omitted, and the liquid crystal display can be thinned further.

The reflective polarizing plate can be formed in any known manner such as forming a reflector of metal or the like on one surface of the polarizing plate that exhibits an elastic modulus. More specifically, for example, a transparent protective layer of the polarizing plate is prepared by matting one surface (surface to be exposed) as required. On this surface, a foil comprising a reflective metal such as aluminum or a deposition film is applied to form a reflector.

An additional example of a reflective polarizing plate includes the transparent protective layer that has a surface with microscopic asperities formed by blending fine particles in transparent resins as described above. The reflective polarizing plate also includes a reflecting layer corresponding to the microscopic asperities. The reflecting layer having a microscopic asperity surface diffuses incident light irregularly so that directivity and glare can be prevented and irregularity in color tones can be controlled. The reflector can be formed as the foil or the deposition film comprising a metal, by attaching a metal directly on a surface of the transparent protective layer with microscopic asperities in any conventional and appropriate methods including deposition such as vacuum deposition, and plating such as ion plating and sputtering.

The above-mentioned reflective polarizing plate is manufactured by directly forming the reflector on a transparent protective layer of the polarizing plate. Alternatively, the reflector can be used as a reflecting sheet formed by providing a reflecting layer onto a proper film similar to the transparent protective film. Since a typical reflecting layer of a reflector is made of a metal, it is preferably used in a state coated with the film, a polarizing plate or the like in order to prevent a reduction of the reflection rate due to oxidation, and by extension, to maintain the initial reflection rate for a long period, and to prevent formation of an additional transparent protective film.

The semitransparent polarizing plate is provided by replacing the reflector in the above-mentioned reflective polarizing plate by a transflector, and it is exemplified by a half mirror that reflects and transmits light at the reflector.

In general, such a semitransparent polarizing plate is arranged on a backside of a liquid crystal cell, and can be used for the following: a liquid crystal display comprising the semitransparent polarizing plate, wherein incident light from the visible side (display side) is reflected to display an image when a liquid crystal display is used in a relatively bright atmosphere, while in a relatively dark atmosphere, an image is displayed by using a built-in light source such as a backlight on the backside of the semitransparent polarizing plate. In other words, the semitransparent polarizing plate can be used to form a liquid crystal display that can save energy for a light source such as a backlight under a bright atmosphere, while a built-in light source can be used under a relatively dark atmosphere.

Next, an example of a polarizing plate comprising a brightness-enhancement film further laminated on a laminated polarizing plate of the present invention will be described.

The brightness-enhancement film is not particularly limited, but a suitable example of the brightness-enhancement film is selected from a multilayer thin film of a dielectric or a multilayer lamination of thin films with varied refraction aeolotropy (e.g., trade name: D-BEF manufactured by 3M Co.) that transmits linearly polarized light having a predetermined polarization axis while reflecting other light, and a cholesteric liquid crystal layer, more specifically, an oriented film of a cholesteric liquid crystal polymer or an oriented liquid crystal layer fixed onto a supportive substrate (e.g., trade name: PCF 350 manufactured by Nitto Denko Corporation, or trade name: Transmax manufactured by Merck and Co., Inc.) that reflects either clockwise or counterclockwise circularly polarized light while transmitting other light.

Above stated polarizing plate of the present invention may be an optical member including, for example, a laminated polarizing plate of the present invention and at least two optical layers laminated further thereon.

An optical member comprising a laminate of at least two optical layers can be formed by a method of laminating layers separately in a certain order for manufacturing a liquid crystal display or the like. Since an optical member that has been laminated previously has excellent stability in quality and assembling operability, efficiency in manufacturing a liquid crystal display can be improved. Any appropriate adhesives such as a pressure-sensitive adhesive layer can be used for the lamination.

It is preferable that the above-described various polarizing plates further comprise pressure-sensitive adhesive layers and adhesive layers, so that lamination of the polarizing plates onto the other member such as a liquid crystal cell will be facilitated. The pressure-sensitive adhesive layers and adhesive layers can be arranged on one or both surface of the polarizing plates. Materials of the pressure-sensitive adhesive layers are not particularly limited, and conventionally known materials such as acrylic polymers can be used. More specifically, materials for the pressure-sensitive adhesive layer are particularly preferred to have low moisture absorption and excellent heat resistance, in order to prevent foaming and exfoliation caused by moisture absorption, and optical characteristics deterioration and warp of a liquid crystal cell caused by the thermal expansion difference, accordingly to manufacture a liquid crystal display with high quality and excellent durability. The pressure-sensitive adhesive layer may contain fine particles for diffusing light. The pressure-sensitive adhesive layer can be formed on the surface of the polarizing plate, for example, by adding the solution or molten liquid of various sticking materials directly on a predetermined face of the polarizing plate by the expanding method such as flow-expanding and coating. The pressure-sensitive adhesive layer on the surface of the polarizing plate may be obtained also by forming a pressure-sensitive adhesive layer on a below-mentioned separator in the same manner as described above, subsequently removing and fixing it onto a predetermined surface of the polarizing plate. Here, the pressure-sensitive adhesive layer can be formed on any surface of the polarizing plate. Specifically for example, it can be formed on the exposed surface of the retardation plate in the polarizing plate.

When a surface of a pressure-sensitive adhesive layer on a surface of the polarizing plate is exposed, the pressure-sensitive adhesive layer is preferably covered with a separator until the time the pressure-sensitive adhesive layer is used so that contamination will be prevented. The separator can be formed by coating, on an appropriate film such as the transparent protective film, a layer including at least one layer of a peeling agent containing silicone, long-chain alkyl, fluorine, molybdenum sulfide or the like as required.

The pressure-sensitive adhesive layer or the like may be, for example, a single layer or a laminate. For the laminate, for example, layers different from each other in the compositions and in the types can be combined. In a case of arranging on both surfaces of the polarizing plate, the pressure-sensitive layers can be the same or can be different from each other in the compositions and the types.

The thickness of the pressure-sensitive adhesive layer can be determined according to the configuration of the polarizing plate or the like, and generally, it ranges from 1 to 500 µm.

The sticking agent forming the pressure-sensitive adhesive layer has excellent optical transparency and sticking properties including appropriate wettability, cohesiveness, and stickiness. For example, sticking agent can be prepared by processing a polymer such as an acrylic polymer, a silicone-based polymer, polyester, polyurethane, polyether and polymers based on a synthetic rubber, as a base polymer, as required.

The sticking property of the pressure-sensitive adhesive layer can be controlled by a conventionally known method, for example, by controlling the cross-linking degree and molecular weight depending on the composition, the molecular weight, the cross-linking form, the content of the cross-linking functional group and the rate for blending the cross-linking agent for the base polymer forming the pressure-sensitive adhesive layer.

The above-described layers of the present invention, such as an optical film, a laminated polarizing plate, polarizing films for forming various optical members (various polarizing plates prepared by laminating optical layers), a transparent protective layer, an optical layer, and a pressure-sensitive adhesive layer can have ultraviolet absorption power as a result of treatment with an ultraviolet absorber such as an salicylate compound, a benzophene-based compound, a benzotriazole compound, a cyanoacrylate compound, and a nickel complex salt compound.

As mentioned above, an optical film and a laminated polarizing plate of the present invention is preferably used for manufacturing various devices such as liquid crystal displays. For example, they are arranged on one or both surfaces of a liquid crystal cell to form a liquid crystal panel so as to provide various types of liquid crystal displays such as reflective, semitransparent, transparent-reflective liquid crystal displays or the like.

The kind of the liquid crystal cell forming a liquid crystal display may be selected arbitrarily, and can be any type of liquid crystal cells such as an active-matrix driving type represented by a thin-film transistor type, or a simple-matrix driving type represented by a twisted nematic type or a super twisted nematic type. Among them, since the optical film and the polarizing plate of the present invention are particularly excellent in the optical compensation for a VA (vertically aligned) cell, they are suitably used for viewing angle compensating films for VA-mode liquid crystal displays.

Generally, the liquid crystal cell has a configuration that liquid crystal is injected between liquid crystal cell substrates that are arranged facing each other. The liquid crystal cell substrate is not particularly limited, and the examples include a glass substrate and a plastic substrate. Moreover, materials of the plastic substrate are not limited specifically, and conventionally known materials can be used.

When polarizing plates or optical members are arranged on both surfaces of a liquid crystal panel, the kinds of polarizing plates or the optical members on the surfaces can be the same or different. Moreover, for forming a liquid crystal display, an appropriate member such as a prism array sheet, a lens array sheet, an optical diffuser and a backlight can be arranged by one or plural layer(s) at proper positions as required.

Furthermore, a liquid crystal display of the present invention is not limited particularly, except that it includes a liquid crystal panel of the present invention. When the liquid crystal display includes a light source, the light source is not particularly limited, but a flat light source emitting polarized light is preferred since it enables effective use of light energy.

Figure 4:
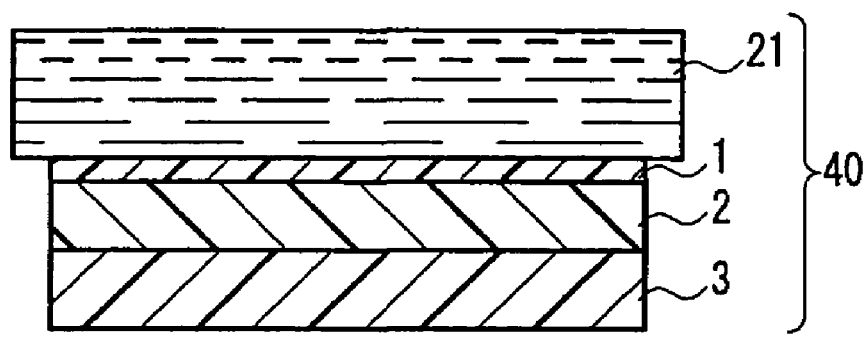
FIG. 4 is a cross-sectional view of an example of a liquid crystal panel of the present invention.

The cross-sectional view in FIG. 4 shows one example of a liquid crystal panel of the present invention. As shown in the figure, a liquid crystal panel 40 includes a liquid crystal cell 21, an optical film 1, a polarizer 2 and a transparent protective layer 3. The optical film 1 is laminated on one surface of the liquid crystal cell 21, and the polarizer 2 and the transparent protective layer 3 are laminated in this order on the other surface of the optical film 1. The liquid crystal cell includes two liquid crystal cell substrates and liquid crystal that is held between the two liquid crystal cell substrates (not shown in the figure). As mentioned above, the optical film 1 is a laminate of a birefringent layer (a) and a transparent film (b), the birefringent layer (a) faces the liquid crystal cell 21 and the transparent film (b) faces the polarizer 2.

In the liquid crystal display of the present invention, a diffusion plate, an anti-glare layer, an antireflection film, a protective layer or a protective plate further may be disposed on the optical film (a polarizing plate) on the viewing side. Alternatively, a retardation plate for compensation or the like can be arranged between a liquid crystal cell and a polarizing plate in a liquid crystal panel, as required.

An optical film and a laminated polarizing plate of the present invention can be used not only in the above-described liquid crystal display but also in, for example, self-light-emitting displays such as an organic electroluminescence (EL) display, a PDP, and a FED. When using the optical film and the laminated polarizing plate of the present invention as antireflective filters in self-light-emitting flat displays, circularly polarized light can be obtained, for example, by setting an in-plane retardation value ($\Delta$nd) of a birefringent optical film of the present invention to be $\lambda/4$.

The following is a specific description of an electroluminescence (EL) display including a polarizing plate of the present invention. The EL display of the present invention is a display including the optical film or the laminated polarizing plate of the present invention and can be either an organic EL display or an inorganic EL display.

In recent years, in an EL display as well, use of optical films such as a polarizer and a polarizing plate together with a $\lambda/4$ plate have been proposed for preventing reflection from an electrode in a black condition. An optical film and a laminated polarizing plate of the present invention are exceedingly useful, particularly for example, when any of linearly polarized light, circularly polarized light or elliptically polarized light is emitting from an EL layer, and when obliquely-emitted light among natural light emitted in the front direction is partly polarized.

A typical organic EL display is described below in detail. The organic EL display generally includes a light emitter (an organic EL light emitter) formed by laminating a transparent electrode, an organic light-emitting layer and a metal electrode in this order on a transparent substrate. The organic light-emitting layer is a laminate of various kinds of organic thin films. Examples of the combination include: a laminate of a hole-injecting layer including triphenylamine derivative or the like and a light-emitting layer comprising a fluorescent organic solid body such as anthracene; a laminate of the light-emitting layer and an electron-injective layer comprising perylene derivative or the like; and a laminate of the hole-injecting layer, the light-emitting layer and the electron-injective layer.

The organic EL display emits light in the following principle. That is, holes and electrons are injected into the organic light-emitting layer by applying voltage to the positive and negative electrodes, and energy generated by recombination of the holes and the electrons excites fluorescent substances, and the thus excited fluorescent substances emit light when recovering to the ground state. The mechanism of the recombination of the holes and electrons is similar to that of a general diode, and a current and emission intensity show strong nonlinearity involving commutation with respect to the applied voltage.

In the organic EL display, at least one of the electrodes must be transparent so that the light emitted in the organic light-emitting layer can be taken out. Therefore, a transparent electrode formed of a transparent conductor such as indium tin oxide (ITO) is generally used as a positive electrode. On the other hand, in order to facilitate electron injection and increase the light emission efficiency, it is important to use a substance with a small work function for a negative electrode, and thus a metal electrode such as Mg—Ag and Al—Li is used in general.

In an organic EL display having the above-mentioned configuration, the organic light-emitting layer is preferably formed of an exceedingly thin film, for example, with a thickness of about 10 nm, so that the organic light-emitting layer will penetrate light almost perfectly, just as the transparent electrode does. Therefore, a light beam, which enters through the surface of the transparent substrate and passes through the transparent electrode and the organic light-emitting layer so as to be reflected on the metal electrode, is emitted again toward the surface of the transparent substrate during a non-emission period. As a result, a screen of the organic EL display appears like a mirror when visually identified from outside.

An organic EL display of the present invention, for example, includes the organic EL light-emitter that has a transparent electrode formed on the surface side of the organic light-emitting layer and a metal electrode formed on the backside of the same organic light-emitting layer. In the organic EL display, it is preferable that an optical film (e.g., a polarizing plate) of the present invention is arranged on the surface of the transparent electrode, and further preferably, a λ/4 plate is arranged between a polarizing plate and an EL element. By arranging the optical film of the present invention in this manner, the organic EL display will have an effect of preventing the reflection of external light and enable to improve visual recognition. It is preferable that a retardation plate is arranged between the transparent electrode and the optical film.

The retardation plate and the optical film (a polarizing plate or the like) have, for example, a polarizing effect against light that enters from outside and is reflected by the metal electrode, and due to the polarizing effect, a mirror-like surface of the metal electrode is prevented from being recognized visually from outside. In particular, when a 1/4 wavelength plate is used as a retardation plate and furthermore, the angle between the polarizing directions of the polarizing plate and the retardation plate is set to be π/4, the mirror-like surface of the metal electrode can be fully shielded. More specifically, only a linearly polarized component of the external light entering the organic EL display penetrates by means of the polarizing plate. The linearly polarized light is generally converted into elliptically polarized light by the retardation plate, and particularly, it is converted into circularly polarized light when the retardation plate is a 1/4 wavelength plate and the angle between the polarizing directions of the polarizing plate and the retardation is π/4.

The circularly polarized light penetrates, for example, a transparent substrate, a transparent electrode and an organic thin film, reflected by the metal electrode, thereafter penetrates the organic thin film, the transparent electrode and the transparent substrate again, and it is converted into the linearly polarized light again at the retardation plate. This linearly polarized light cannot penetrate the polarizing plate because its polarizing direction is orthogonal to that of the polarizing plate, thereby, the mirror surface of the metal electrode can be fully shielded, as mentioned above.

DESCRIPTION OF THE PREFERRED EMBODIMENTS

Examples of the present invention and Comparative examples will be described further below in detail, though the present invention is not limited to the Examples. The characteristics of the optical film were measured in the following manner.

(Retardation Value Δnd, Precision in Orientation Axis)

A retardation value and a precision in orientation axis were measured with a retardation analyzer (trade name: KOBRA-21ADH manufactured by Oji Scientific Instruments).

(Refractive Index)

A refractive index at a wavelength of λ=590 was measured with KOBRA-21ADH (trade name) manufactured by Oji Scientific Instruments.

(Thickness)

A thickness is measured with DIGITAL MICROMETER-K-351C manufactured by Anritsu.

EXAMPLE 1

Polyimide having molecular weight (Mw) of 70,000, which is represented by the below-mentioned figure (6), was synthesized from 2,2-bis(3,4-dicarboxyphenyl)hexafluoropropane dianhydride (6FDA) and 2,2'-bis(trifluoromethyl)-4,4'-diaminobiphenyl (TFMB), and dissolved in cyclohexanone so as to prepare a 15 wt % polyimide solution. Regarding the preparation of polyimide or the like, description of "Polymer" 40 (1999) 4571-4583, F. Li et al. was referenced to. A triacetylcellulose (TAC) film with a thickness of 80 μm was stretched 1.3 times its original length in the transverse direction by fixed-end transverse stretching at 175° C., thereby a stretched TAC film with a thickness of 75 μm was obtained. The thus stretched TAC film was coated with the polyimide solution, and dried for 10 minutes at 100° C., so as to obtain an optical film. The optical film includes a completely transparent and flat stretched TAC film with a thickness of 75 μm and Δn(b) of approximately 0.0006 (a transparent film (b)), and a polyimide film with a thickness of 6 μm and Δn(a) of approximately 0.04 (the birefringent layer (a)), being laminated on the transparent film (b). This optical film included a birefringent layer having an optical characteristic of nx>ny>nz.

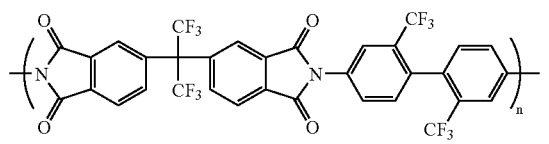

(6)

EXAMPLE 2

Polyetherketone (Mw=500,000) represented by the below-mentioned figure (18) was dissolved in methyl isobutyl ketone so as to prepare a 20 wt % varnish. This vanish was coated on a stretched TAC film as in Example 1, and dried for 10 minutes at 100° C. so as to obtain an optical film. The optical film included a completely transparent and flat stretched TAC film with a thickness of 75 μm and a Δn(b) of approximately 0.0006 (a transparent film (b)), and a polyether ketone film with a thickness of 10 μm and a Δn(a) of approximately 0.02 (a birefringent layer (a)), laminated on the transparent film (b). This optical film included a birefringent layer having an optical characteristic of nx>ny>nz.

transparent and flat TAC film with a thickness of 80 μm and a Δn(b) of approximately 0.0006 (a transparent film (b)), and a polyimide film with a thickness of 6 μm and a Δn(a) of approximately 0.04 (a birefringent layer (a)), being laminated on the transparent film (b). This optical film included a birefringent layer having an optical characteristic of nx>ny>nz.

EXAMPLE 5

75 weight parts of alternating copolymer (containing N-methylmaleimide of 50 mol %) synthesized from isobutene and N-methylmaleimide and 25 weight parts of acrylonitrile-styrene copolymer containing 28 wt % of acrylonitrile were dissolved in methylene chloride so as to prepare a polymer solution with the solid concentration of 15 wt %. This polymer solution was flow-expanded onto a polyethylene terephthalate (PET) film arranged on a glass plate, and left for 60 minutes at room temperature. A polymer film formed on the PET film was peeled off and dried for 10 minutes at 100° C., further 10 minutes at 140° C., and still further 30 minutes at 160° C., so as to obtain a transparent film (b). The film had an in-plane retardation value (Δnd=(nx−ny)×d) of 1 nm, and a retardation value (Rtn=(nx−nx)×d) of 4 nm in the thickness direction.

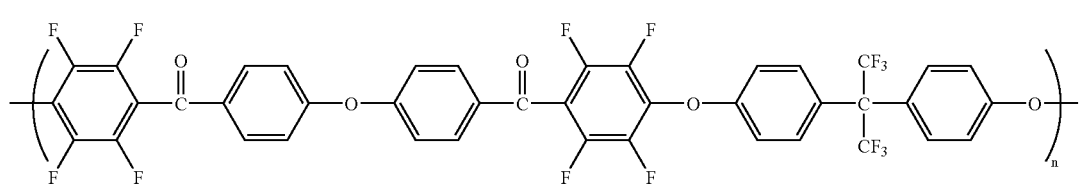

(18)

EXAMPLE 3

Polyimide (Mw=30,000) was synthesized from 4,4'-bis(3,4-dicarboxyphenyl)-2,2-diphenylpropane dianhydride and 2,2'-dichrolo-4,4'-diaminobiphenyl, and dissolved in cyclopentanone so as to prepare a 20 wt % polyimide solution. This solution was coated on an unstretched TAC film with a thickness of 80 μm, dried for 5 minutes at 130° C., and stretched by 10% its original length by longitudinal uniaxial stretching at 150° C. so as to obtain an optical film. The optical film included a completely transparent and flat TAC film with a thickness of 80 μm and a Δn(b) of approximately 0.0006 (a transparent film (b)), and a polyimide film with a thickness of 5 μm and a Δn(a) of approximately 0.025 (a birefringent layer (a)), being laminated on the transparent film (b). This optical film included a birefringent layer having an optical characteristic of nx>ny>nz.

EXAMPLE 4

Polyimide (Mw=100,000) was synthesized from 2,2-bis(3,4-dicarboxyphenyl)hexafluoropropane dianhydride and 2,2'-bis(trifluoromethyl)-4,4'-diaminobiphenyl, and dissolved in cyclohexanone so as to prepare a 15 wt % polyimide solution. This solution was coated on an unstretched TAC film with a thickness of 80 μm, dried for 5 minutes at 130° C. and stretched by 10% its original length by longitudinal uniaxial stretching at 150° C. so as to obtain an optical film. The optical film included a completely The thus obtained transparent film (b) was coated with the polyimide solution as in Example 1, dried for 5 minutes at 100° C., and stretched by 10% its original length by longitudinal uniaxial stretching at 130° C. so as to obtain an optical film. The optical film included a completely transparent and flat mixed polymer film with a thickness of 50 μm and a Δn(b) of approximately 0.001 (a transparent film (b)), and a polyimide film with a thickness of 6 μm and a Δn(a) of approximately 0.035 (a birefringent layer (a)), being laminated on the transparent film (b). This optical film included a birefringent layer having an optical characteristic of nx>ny>nz.

EXAMPLE 6

Polyimide as in Example 1 was dissolved in methyl isobutyl ketone so as to prepare a 25 wt % polyimide solution. This polyimide solution was coated on a stretched TAC film as in Example 1, and dried for 5 minutes at 160° C. so as to obtain an optical film. The optical film included a completely transparent and flat stretched TAC film with a thickness of 75 μm and a Δn(b) of approximately 0.0006 (a transparent film (b)), and a polyimide film with a thickness of 6 μm a Δn(a) of approximately 0.04 (a birefringent layer (a)), being laminated on the transparent film (b). This optical film included a birefringent layer having an optical characteristic of nx>ny>nz.

EXAMPLE 7

A polyimide solution as in Example 1 was coated on an unstretched TAC film with a thickness of 80 μm, and dried for 10 minutes at 100° C., thereby obtaining an optical film. The optical film included a completely transparent and flat TAC film with a thickness of 80 μm and a Δn(b) of approximately 0.0006 (a transparent film (b)), and a polyimide film with a thickness of 4 μm and a Δn(a) of approximately 0.025 (a birefringent layer (a)), being laminated on the transparent film (b). This optical film included a birefringent layer having an optical characteristic of nx≈ny>nz.

Comparative Example 1

A polynorbornene-based resin film having a Δn of approximately 0.002 (trade name: ARTON film manufactured by JSR Corporation) stretched 1.3 times its original length by fixed-end transverse stretching at 175° C., thus obtained a film with a thickness of 80 μm. In an evaluation of the birefringent index, this optical film had a birefringent characteristic of nx>ny>nz.

Comparative Example 2

A polyimide solution as in Example 1 was coated on a glass plate and dried for 10 minutes at 100° C. so as to prepare a polyimide film. Subsequently, the polyimide film was peeled off from the glass plate so that a completely transparent and flat film with a thickness of 7 μm and a Δn of approximately 0.04 was obtained. This optical film had a birefringent characteristic of nx≈ny>nz.

Comparative Example 3

A polyethylene terephthalate (PET) film with a thickness of 75 μm was stretched 1.3 times of its original length in the transverse direction by fixed-end transverse stretching at 175° C. so as to obtain a stretched PET film with a thickness of 75 μm. Then the stretched PET film was coated with the polyimide solution as in Example 1, and dried for 5 minutes at 150° C., thereby obtaining an optical film. The optical film included a completely transparent and flat stretched PET film with a thickness of 75 μm and a Δn(b) of approximately 0.08 (a transparent film (b)), and a polyimide film with a thickness of 6 μm and a Δn(a) of approximately 0.04 (a birefringent layer (a)), being laminated on the transparent film (b). This optical film included a birefringent layer having an optical characteristic of nx>ny>nz.

Comparative Example 4

The solution as in Example 3 was coated onto a stretched PET film of Comparative example 3, thereafter dried for 5 minutes at 150° C. so as to obtain an optical film. The optical film included a completely transparent and flat stretched PET film with a thickness of 75 μm and a Δn(b) of approximately 0.08 (a transparent film (b)), and a polyether ketone film with a thickness of 10 μm and a Δn(a) of approximately 0.035 (a birefringent layer (a)), being laminated on the transparent film (b). This optical film included a birefringent layer having an optical characteristic of nx>ny>nz.

With regard to each of the birefringent layers of the optical film obtained in Examples and Comparative examples, Δnd (=(nx−ny)×d), Rth (=(nx−nz)×d), Nz (=(nx−nz)/(nx−ny)), thickness, and a precision of orientation axis were measured respectively. Except the birefringent layer of Example 5, each of the birefringent layers is peeled from the optical film in order to measure the birefringent layer alone. For the measurement of the birefringent layer of Example 5, an optical film was manufactured under a similar condition except that the transparent film (b) used in Example 5 was replaced by a TAC film from which the birefringent layer was peeled off. The results are shown in Table 1.

TABLE 1

|  | Δn(b) | Δn(a) | Δnd (nm) | Rth (nm) | Nz | Thickness (μm) | Precision of orientation axis |
|---|---|---|---|---|---|---|---|
| Example 1 | 0.0006 | 0.045 | 135 | 270 | 2.0 | 6 | −0.5–+0.5 |
| Example 2 | 0.0006 | 0.020 | 10 | 200 | 20 | 10 | −0.5–+0.5 |
| Example 3 | 0.0006 | 0.025 | 50 | 125 | 2.5 | 5 | −0.5–+0.5 |
| Example 4 | 0.0006 | 0.039 | 100 | 235 | 2.4 | 6 | −0.5–+0.5 |
| Example 5 | 0.001 | 0.035 | 80 | 210 | 2.6 | 6 | −0.5–+0.5 |
| Example 6 | 0.0006 | 0.038 | 70 | 230 | 3.3 | 6 | −0.5–+0.5 |
| Example 7 | 0.0006 | 0.025 | 0.9 | 100 | 111.1 | 4 | — |
| Comparative example 1 | — | 0.002 | 91 | 182 | 2.0 | 80 | −2.5–+2.5 |
| Comparative example 2 | — | 0.043 | 0.3 | 298 | 993.3 | 7 | — |
| Comparative example 3 | 0.08 | 0.042 | 50 | 250 | 5.0 | 6 | −0.5–+0.5 |
| Comparative example 4 | 0.08 | 0.035 | 44 | 370 | 8.0 | 10 | −0.5–+0.5 |

As shown in Table 1, the optical film of each Example satisfied all the formulae (I), (II) and (III), whereas none of the optical films of Comparative examples 1 to 4 satisfied the formula (I).

(Evaluation of Display Properties)

Each of the optical films obtained in Examples 1 to 7 and Comparative examples 1 to 4 was laminated on a commercially available polarizing plate (trade name: HEG1425DU manufactured by Nitto Denko Corporation) via an acrylic sticking agent so as to manufacture a polarizing plate integrally laminated with an optical compensating layer. Here, each of the polarizing plate was laminated on the optical film, so that the polarizing plate will face the transparent film (b) of the optical film. Furthermore, the laminated polarizing plate was attached to the backlight side of a liquid crystal cell, so that the polarizing plate will be arranged on outermost side, thus a liquid crystal display was manufactured.

Thereafter, display properties of each liquid crystal display were evaluated. As a result of the evaluation, by using the optical films of Example 1 to 7, an excellent contrast and display uniformity were observed in a wide viewing angle when viewed in the front and oblique directions, a rainbow-colored irregularity was restrained. Particularly, the rainbow-colored irregularity was sufficiently restrained and excellent display quality was exhibited by using any of the optical films of Examples 1-6 in which the formula (II) was 100 or lower. On the other hand, when using the optical films of Comparative examples, a rainbow-colored irregularity was occurred due to the depolarization, and thus the displays were not recognized clearly. The above-stated results show that, in contrast to the optical films of Comparative examples, an optical film of the present invention, which satisfies all the formulae (I), (II) and (III), can provide a liquid crystal display with excellent display property, restraining occurrence of the rainbow-colored irregularity.

INDUSTRIAL APPLICABILITY

As mentioned above, an optical film of the present invention satisfying the formulae (I), (II) and (III) is thin and transparent, and also it has an optical characteristic of nx>ny>nz and excellent optical properties. Therefore, an optical film of the present invention can realize a thin liquid crystal display and a thin self-light-emitting display which provide not only an excellent contrast in a wide viewing angle when viewed in the front and oblique directions, but also an excellent display quality while restraining occurrence of the rainbow-colored irregularity.

The invention claimed is:

1. An optical film comprising a birefringent layer (a) and a transparent film(b), wherein the birefringent layer is laminated on the transparent film, satisfying all the following formulae (I), (II) and (III):

$$\Delta n(a) > \Delta n(b) \times 10 \quad \text{(I)}$$

$$1 < (nx-nz)/(nx-ny) \quad \text{(II)}$$

$$0.0005 \leq \Delta n(a) \leq 0.5 \quad \text{(III)}$$

$\Delta n(a)$ is a birefringent index of the birefringent layer (a) and $\Delta n(b)$ is a birefringent index of the transparent film (b), respectively represented by the following equations:

$$\Delta n(a) = [(nx+ny)/2] - nz$$

$$\Delta n(b) = [(nx'+ny')/2] - nz',$$

in the above formulae (II) and the above-stated equations, nx, ny and nz indicate respectively refractive indexes in an X-axis direction, a Y-axis direction and a Z-axis direction in the birefringent layer (a); nx', ny' and nz' indicate respectively refractive indexes in an X-axis direction, a Y-axis direction and a Z-axis direction in the transparent film (b); and the X-axis corresponds to an axial direction exhibiting a maximum refractive index within a plane of the birefringent layer (a) and the transparent film (b), the Y-axis corresponds to an axial direction perpendicular to the X-axis within the plane, and the Z-axis corresponds to a thickness direction perpendicular to the X-axis and the Y-axis.

2. The optical film according to claim 1, wherein the birefringent layer (a) is laminated directly on the transparent film (b).

3. The optical film according to claim 1, wherein the birefringent layer (a) comprises a non-liquid crystal material.

4. The optical film according to claim 3, wherein the non-liquid crystal material is at least one polymer material selected from the group consisting of polyamide, polyimide, polyester, polyetherketone, polyamide imide, and polyester imide.

5. The optical film according to claim 1, obtained by coating the material of the birefringent layer (a) directly on the transparent film (b) having a shrinking property so as to form a coating film, and shrinking the coating film in accordance with the shrinkage of the transparent film (b).

6. The optical film according to claim 5, wherein the transparent film (b) is shrunk by heat.

7. The optical film according to claim 1, obtained by coating the material of the birefringent layer (a) directly on the transparent film (b) so as to form a coating film, and stretching both the transparent film (b) and the coating film concurrently.

8. The optical film according to claim 1, further comprising at least one of an adhesive layer and a pressure-sensitive adhesive layer.

9. The optical film according to claim 8, wherein at least one of the adhesive layer and the pressure-sensitive adhesive layer is laminated on an outer layer.

10. A laminated polarizing plate comprising an optical film and a polarizer, wherein the optical film is of claim 1.

11. A liquid crystal panel comprising a liquid crystal cell and an optical member arranged on at least one surface of the liquid crystal cell, wherein the optical member is the laminated polarizing plate according to claim 10.

12. A liquid crystal display comprising a liquid crystal panel, wherein the liquid crystal panel is of claim 11.

13. A self-light-emitting display comprising the laminated polarizing plate according to claim 10.

14. A liquid crystal panel comprising a liquid crystal cell and an optical member arranged on at least one surface of the liquid crystal cell, wherein the optical member is the optical film according to claim 1.

15. A liquid crystal display comprising a liquid crystal panel, wherein the liquid crystal panel is of claim 14.

16. A self-light-emitting display comprising the optical film according to claim 1.

* * * * *